Figure 1:
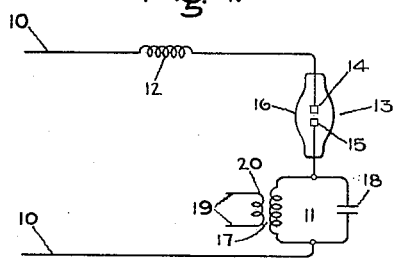

April 20, 1937.    L. D. MILES    2,078,151
HIGH FREQUENCY POWER SUPPLY CIRCUIT
Filed April 16, 1936    2 Sheets-Sheet 1

Inventor:
Lawrence D. Miles,
by Harry E. Dunham
His Attorney.

April 20, 1937.  L. D. MILES  2,078,151

HIGH FREQUENCY POWER SUPPLY CIRCUIT

Filed April 16, 1936   2 Sheets-Sheet 2

Inventor:
Lawrence D. Miles,
by Harry E. Dunham
Attorney

Patented Apr. 20, 1937

2,078,151

UNITED STATES PATENT OFFICE 2,078,151

HIGH FREQUENCY POWER SUPPLY CIRCUIT

Lawrence D. Miles, Schenectady, N. Y., assignor to General Electric Company, a corporation of New York Application April 16, 1936, Serial No. 74,646

9 Claims. (Cl. 172—281)

My invention relates to electric systems for the generation of high frequency power, particularly for industrial use, from commercial low voltage continuous current sources and low frequency alternating current sources, and its object is to provide electric systems for the above mentioned and similar purposes which are characterized by low initial and operating costs, in addition to simplicity, efficiency, reliability and small space and weight requirements.

It is recognized that in the use of alternating electric power in industrial applications an optimum frequency exists for performing a given operation. For example, 360 cycle power is commonly used to bake enamel on automobile fenders; 1,000 to 2,000 cycle for metal and scrap melting; 900 to 2,000 cycle power for certain alloying processes; 4,800 cycle power in the manufacture of razor blade steel; 5,000 cycle power in ozone generation; 30,000 cycle power for certain pipe welding processes; 40,000 to 50,000 cycle power in small induction furnaces; and 50,000 cycle power in sterilizing milk.

Various types of apparatus have been proposed and used for providing high frequency power, among which are equipment including rotating electric machines, equipment including high vacuum discharge devices or tubes, and equipment including vapor electric or gaseous discharges or tubes.

Difficulties have been encountered, however, in certain cases in the application of these and other types of apparatus to the supply of kilocycle frequency power. In any of the above cited systems used heretofore for the supply of high frequency power, requirements in the matter of operating costs, efficiency and life have been reasonably well met in general but the principal difficulty encountered in their application to general industrial uses has been relatively high initial cost.

In accordance with my present invention I have obviated the above mentioned and other difficulties attendant on the supply of high frequency power, by the provision of novel electric circuit arrangements which employ the arc tube as an element in the source of high frequency power. The arc tube consists essentially of two electrodes closely spaced in inert gas, preferably hydrogen, under relatively high pressure. In this tube an optimum gas pressure may be used to give optimum power, the electrodes may be spaced permanently for maximum efficiency at rated output, and oxygen and water vapor may be driven from the tube before inert gas is admitted, thus insuring uniform power, high efficiency and long life. The optimum circuit arrangement for any given installation depends on the type of load, the wave shape and the frequency desired. Besides the arc tubes, essential equipment comprises choke coils and resistors, or both, in the direct current or commercial alternating current single phase or polyphase supply circuits, and capacitors and inductors associated with the arc tubes in high frequency oscillating tube circuits. Output at the desired voltage is usually taken from secondaries of transformers constituting inductors, or in certain cases, as in induction furnace heating, output is taken directly from the inductors which then constitute the furnace coils.

My invention will be better understood from the following description when considered in connection with the accompanying drawings and its scope will be pointed out in the appended claims.

Figure 3:
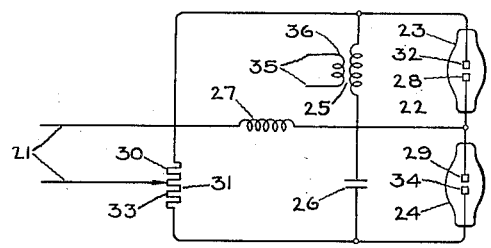
Figure 4:
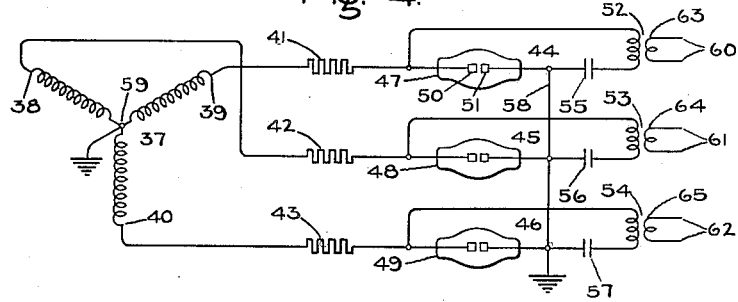
Figure 5:
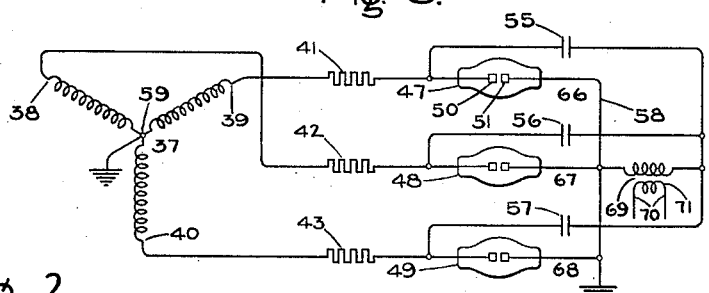
Figure 2:
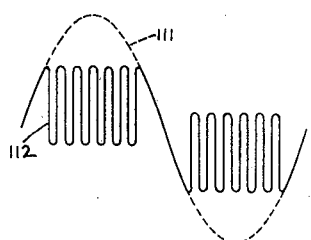
Figure 6:
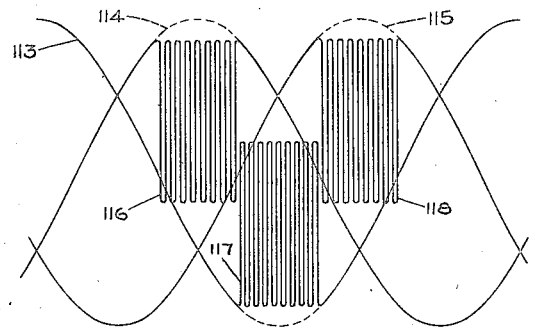
Figure 7:
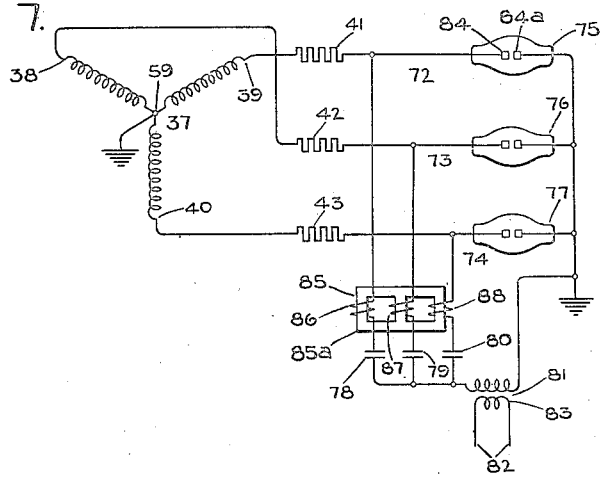
Figure 8:
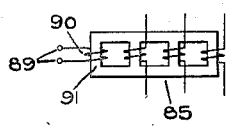
Figure 9:
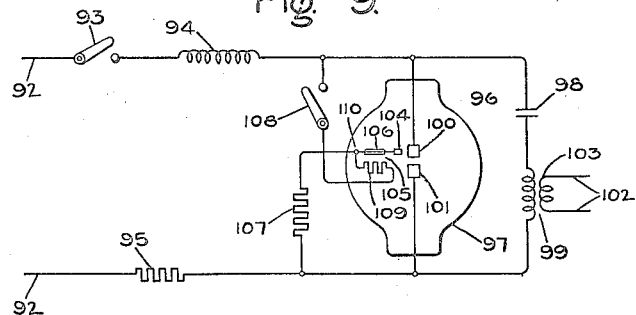

Referring to the drawings, Fig. 1 is a diagrammatic representation of a high frequency power system, including a single arc tube, in which my invention has been embodied; Fig. 2 shows curves illustrating the operation of the system shown in Fig. 1; Fig. 3 is a diagrammatic representation of a high frequency power system embodying my invention, including preferably two double-electrode arc tubes; Fig. 4 represents diagrammatically a high frequency power system embodying my invention, having a multiphase input and a plurality of outputs; Fig. 5 represents a system embodying my invention, similar to that of Fig. 4 but having a single output; Fig. 6 shows curves illustrating the operation of the systems of Figs. 4 and 5; Fig. 7 represents diagrammatically a high frequency power system embodying my invention, similar to that shown in Fig. 5 but including a phasing means in the oscillation circuits; Fig. 8 illustrates a different means in accordance with my invention for taking the output from the circuit shown in Fig. 7; and Fig. 9 represents diagrammatically a high frequency power system in accordance with my invention including a starting circuit for the arc tube.

In Fig. 1, numeral 10 designates a direct current input circuit which may be, for example, of commercial low voltage, or an alternating current circuit such as a usual low voltage commercial frequency single-phase power circuit. The input circuit 10 is connected to a high frequency oscillation circuit 11 through an inductance or choke coil 12 and an arc-tube 13 including two similar closely spaced electrodes 14, 15 in a relatively high pressure hydrogen atmosphere and enclosed in a glass tube 16. The oscillation circuit 11, in series with tube 13, includes in series a transformer 17, constituting an inductor element, and a capacitor 18. The numeral 19 designates an output circuit for the high frequency power, connected to the secondary 20 of the transformer 17.

In Figure 3, numeral 21 designates a direct current or an alternating current input circuit as in Fig. 1. Input circuit 21 is connected to a high frequency oscillation circuit 22 including in series two arc-tubes 23, 24, a transformer 25 constituting an inductor, and a capacitance 26. One side of the input circuit 21 is connected as through an inductance or choke coil 27 and the common connection of the tubes to an electrode, 28, 29, of each of the tubes. The other side of the input circuit 21 is connected through one section 30 of a resistor 31 to the inductor 25 and the other electrode 32 of tube 23, and through the other section 33 of the resistor 31 to the capacitor 26 and the other electrode 34 of the other tube 24. A high frequency output circuit 35 is connected to the secondary 36 of the transformer or inductor 25. Instead of the two double-electrode tubes 23, 24, one three-electrode tube, having a common electrode connected to the choke 27 and two other electrodes corresponding respectively to electrodes 32, 34 may be used.

In Fig. 4, numeral 37 designates a three-phase alternating current circuit of commercial low frequency the three phases 38, 39, 40 of which are connected respectively through resistors 41, 42, 43 to series high frequency oscillation circuits 44, 45, 46 including respectively one of the arc tubes 47, 48, 49, each of which includes a pair of electrodes 50 and 51, one of the transformers 52, 53, 54 constituting inductors, and one of the capacitors 55, 56, 57. One of the electrodes, as 50, of each tube is connected to a different one of the phases 38 to 40 and the other electrode, 51, of each tube is connected, as by a common lead 58 and ground, to the neutral point 59 of the three-phase supply circuit 37. Three separate high frequency output circuits 60, 61, 62 are provided connected respectively to the secondaries 63, 64, 65 of the transformers or inductors 52, 53, 54.

In Fig. 5, the circuit arrangement is similar to that of Fig. 4 in that the phases 38, 39, 40 of the three phase alternating current supply circuit 37 are connected respectively through resistors 41, 42, 43 to series high frequency oscillation circuits which are designated in Fig. 5 by the numerals 66, 67, 68. The latter oscillation circuits include respectively one of the arc-tubes 47, 48, 49 and one of the capacitors 55, 56, 57, but in Fig. 5 the three oscillation circuits include a common inductor element constituted by the transformer 69, and in Fig. 5 a single output circuit 70 is provided connected to the secondary 71 of transformer 69.

In the embodiments of my invention shown in Figs. 4 and 5, the pairs of electrodes 50, 51 of the arc-tubes 47 to 49 are preferably so arranged that the electrode spacing is relatively great, for a purpose to be explained hereinafter.

In Fig. 7, the circuit arrangement is similar to that illustrated in Fig. 5, a three phase alternating current circuit 37 supplying, from its phases 38 to 40 and through resistors 41 to 43, three high frequency oscillation circuits 72 to 74, including respectively one of the arc tubes 75 to 77, one of the capacitors 78 to 80, and the common transformer 81 constituting an inductor, and having the single output circuit 82 connected to the secondary 83 of the transformer. In Fig. 7, however, the spacing of the electrode pairs 84, 84a is not relatively great, and further, in order to produce in the high frequency output circuit 82 overlapping oscillations of the desired and established frequency and phase, a phasing transformer 85 is provided in the oscillation circuits 72 to 74, the phasing transformer comprising a three-legged core 85a and phase windings 86 to 88 connected respectively in series in the oscillation circuits 72 to 74. Instead of the output circuit 82, connected to a secondary winding of the inductor element 81, the output circuit 89 may be provided as shown in Fig. 8 wherein the circuit 89 is connected to a winding 90 on a fourth leg 91 of the phasing transformer 85 of Fig. 7.

It will be understood that in the forms of the invention illustrated in the circuit arrangements of Figs. 1, 3, 4, 5, and 7, suitable means (not shown) for facilitating the initiation of the oscillatory current flow through the arc tubes may be provided.

In Fig. 9, the numeral 92 designates a direct current or alternating current input circuit as in Figs. 1 and 3. Input circuit 92 is connected through a line switch 93, an inductance element or choke coil 94 and a resistor 95 to a high frequency oscillation circuit 96 comprising in series an arc tube 97, a capacitor 98, and a transformer 99 constituting an inductor element. One side of the input circuit 92 is connected to the capacitor 98 and one of the electrodes, as 100, of the arc-tube and the other side of the input circuit is connected to the transformer 99 and the other electrode 101 of the arc-tube. An output circuit 102 is connected to the secondary 103 of the transformer 99.

The arc-tube 97 includes the auxiliary electrode 104 to facilitate starting of the oscillations in the oscillatory circuit. The circuit means to operate the auxiliary electrode 104 comprises a thermostatic device 105 including a movable and heatable element 106, for example, a bimetallic strip, connected to the auxiliary electrode and adapted to move the electrode into and out of contact with one of the main electrodes, as electrode 100. The auxiliary electrode 104 is connected through a resistor 107 to the opposite side of the supply circuit 92, and the resistor 107 is adapted to be connected across the circuit 92 by a switch 108, preferably through the heater element 109 for the thermostatic device 105, whereby the one switch 108 controls the operation of the heater element 109 and also the connection of the resistance element 107 in the auxiliary electrode circuit. Preferably the common point of connection of resistor 107 and heater 109 is at the end 110 of movable thermostatic element 105 opposite to the end of the latter element to which the auxiliary electrode 104 is connected.

In operation of the system shown in Fig. 1, assuming that input circuit 10 is a circuit of commercial low voltage alternating current, the voltage wave of the supply circuit 10 is as shown by curve 111 of Fig. 2. At each half wave of the supply voltage the tube becomes conducting when the breakdown voltage is reached. Oscillations, indicated generally by the curve 112 of Fig. 2, are thereupon set up in the high frequency oscillation circuit 11 and are induced in the output circuit 19. The tube 13 conducts current alternately in one direction and the other as the tube breakdown voltage is reached at each half wave of the supply voltage. Since power from the input circuit 10 continues to be supplied during each half wave to the oscillation circuit 11 as long as the voltage in the supply circuit reaches the breakdown voltage of the tube, the output oscillations during this portion of the half waves are substantially undamped as shown in Fig. 2. In case the input 10 is a direct current circuit, the tube conducts current, as the breakdown voltage is reached, and supplies power to the oscillating circuit 11, in which a continuous train of high frequency oscillations is produced.

In operation of the system shown in Fig. 3, assuming that supply circuit 21 is a commercial low voltage direct current circuit, when voltage is applied to the tubes 23, 24, one of the tubes, as tube 23, breaks down and capacitor 26 is charged to sufficient voltage to cause breakdown of the other tube, 24. Capacitor 26 then discharges through the oscillating circuit 22. At the instant that capacitor 26 is completely discharged, a high current is flowing in the circuit 22. The inductor 25 continues this current flow which over-discharges capacitor 26 and drives the voltage of tubes 23, 24 negative, whereupon the arcs extinguish and the tubes are again on open circuit. The tube 23 then again breaks down, the capacitor 26 is charged and the tube 24 breaks down. The above cycle is repeated to produce high frequency power in circuit 22, and this power is induced in the output circuit 35. In case the input 21 is a commercial low voltage low frequency alternating current circuit, the operation is essentially the same as above described except that the high frequency oscillations are repeated for each half wave of the supply voltage.

In operation of the system shown in Fig. 4, upon impressing voltage on the system from the phases 38 to 40 of the three-phase supply circuit 37 through resistors 41 to 43 thereby charging the capacitors 55 to 57, the tubes 47 to 49 break down in turn and high frequency power is produced in the oscillating circuits 44 to 46. This power is taken out in the three separate circuits 60, 61, 62, inductively related respectively to the inductors 52 to 54 of the oscillatory circuits.

Operation of the system shown in Fig. 5 is similar to that of Fig. 4 except that in Fig. 5, wherein the oscillatory circuits 66 to 68 comprise the common inductor 69, the power is taken from the one output circuit 70 connected to the secondary 71 of the inductor 69.

In the systems of Figs. 4 and 5, wherein the spacing of the tube electrodes 50, 51 is relatively great, the oscillations in any given tube in a half cycle persist for not more than 60 degrees of a half wave of the supply voltage as illustrated in Fig. 6. The curves 113 to 115 are those of the supply voltage phases and curves 116 to 118 those of the corresponding high frequency oscillatory circuits. Therefore, in the circuit arrangements of Figs. 4 and 5, no phasing of the high frequency circuits is necessary as only one tube can generate oscillations at a time. However, by proper adjustment of the tube electrode spacing the kilocycle frequency trains of oscillations 116 to 118 may be caused to overlap slightly or to allow a spacing of a few cycles between the successive oscillation periods as desired.

In Fig. 7, operation is similar to that above described in connection with Fig. 5 in that high frequency power is produced in the three oscillatory circuits, to be taken off in a single output circuit. In Fig. 7, however, the coils of a phasing transformer 85 are so arranged that breakdown of any tube 75 to 77 introduces a positive voltage on another tube. The result is that all tubes having sufficient voltage to break down do so at the same instant, or else do not break down until the succeeding cycle. For three-phase operation, illustrated in Fig. 7, only two tubes pass current at a time but the currents overlap. Therefore, in the operation of the system of Fig. 7, a single phase high frequency output, in circuit 82 of Fig. 7 or circuit 89 of Fig. 8, is obtained from the three-phase input circuit.

In operation of the system shown in Fig. 9 assuming the switches 93, 108 to be in their illustrated positions, on closing of line switch 93 the voltage from input circuit 92 is applied through choke 94 and resistor 95 to the main electrodes 100, 101. Switch 108 is next closed to connect heater 109 of thermostatic device 105 across circuit 92 through resistor 107 and thereby to apply line current to the heater, whereupon movable element or bimetallic strip 106 moves the auxiliary electrode 104 into contact with the main electrode 100. Switch 108 is then opened thereby cutting off the heating current from heater 109. Current is now flowing in the starting electrode circuit through main electrode 100, auxiliary electrode 104 and resistance 107. As the strip 106 cools, because of the cutting off of heater current, the starting electrode 104, carried by the strip, moves away from the main electrode 100 and an arc is formed between electrodes 100 and 104. Current flow in the starting electrode circuit continues as the arc lengthens, and electrodes 100 and 104 are soon both incandescent. However, the arc then shifts from electrode 104 to electrode 101, thereby establishing a lower resistance return path, as current no longer need flow through the resistor 107. The system then starts operating, high frequency oscillations are produced in the oscillatory circuit 96, and power is taken out in the output circuit 102.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. An electric system comprising a relatively low voltage input circuit, an output circuit, and means to produce current of high frequency in said output circuit including an arc tube having two closely spaced similar electrodes in an inert gas under high pressure and an oscillation circuit in series with said arc tube, said oscillation circuit including an inductor and a capacitor in series to determine the frequency of said output current.

2. A high frequency power supply means comprising a relatively low voltage, low frequency alternating current supply circuit, an output circuit, and means to supply oscillatory current to said output circuit including at least one arc tube having two closely spaced similar electrodes in an inert gas and an oscillation circuit in series with said arc tube, said oscillation circuit including inductance and capacitance means in series to determine the frequency of said output current, said supply circuit, said arc tube, and said oscillation circuit being so connected and arranged that current from said supply circuit flows alternately in opposite directions through said arc tube.

3. An electric power supply means comprising an input circuit, a resistor, an oscillatory circuit including in series two arc tubes and an inductor and a capacitor, means to connect one side of said input circuit to a lead connecting said tubes, means to connect the other side of said input circuit through one section of said resistor to said inductor and one of said tubes, and means to connect said other side of said input circuit through another section of said resistor to said capacitor and the other of said tubes.

4. An electric power supply circuit comprising an input circuit, an oscillatory circuit including an inductor and a capacitor and arc tube apparatus having electrodes arranged to provide two space paths in series through said apparatus, means to connect one side of said input circuit to said tube apparatus at a point thereof between said paths, a resistance means connected across said oscillatory circuit and means to connect the other side of said input circuit to an intermediate point of said resistance means.

5. An electric power supply system comprising a polyphase alternating current input circuit, a plurality of oscillatory circuits connected respectively to the corresponding phases of said input circuit and each including frequently determining means comprising capacitance and inductance, and a plurality of arc tubes associated respectively with the corresponding oscillatory circuits and each having a pair of electrodes, the spacing of said electrodes being such that oscillations in any given one of said oscillatory circuits persist only until substantially the beginning of the oscillation period in the next succeeding one of said oscillatory circuits.

6. An electric power supply means comprising a three-phase alternating current input circuit, a plurality of oscillatory circuits connected respectively to the corresponding phases of said input circuit and each including frequency determining means comprising capacitance and inductance, and a plurality of arc tubes associated respectively with the corresponding oscillatory circuits, each of said tubes including a pair of electrodes, the spacing of said electrodes being such as to prevent oscillations in any given one of said oscillatory circuits for more than substantially sixty degrees of a half wave of the corresponding phase of said input circuit.

7. An electric power supply system comprising a polyphase alternating current input circuit, a plurality of oscillatory circuits connected respectively to the corresponding phases of said input circuit and each including a capacitor and an arc tube having a pair of electrodes, and a single inductor common to said oscillatory circuits, the spacing of said electrodes being such that oscillations in any given one of said oscillatory circuits persist only until substantially the beginning of the oscillation period in the next succeeding one of said oscillatory circuits.

8. An electric power supply system comprising a three-phase alternating current input circuit, three oscillatory circuits connected respectively to the corresponding phases of said input circuit and each including a capacitor and an arc tube having a pair of electrodes, a single inductor common to said oscillatory circuits, the spacing of said electrodes being such as to prevent oscillations in any given one of said oscillatory circuits for more than substantially sixty degrees of a half wave of the corresponding phase of said input circuit, and an output circuit associated with said inductor.

9. An electric power supply system comprising an input circuit, an output circuit, means to produce oscillatory current in said output circuit including an inductor, a capacitor, and an arc tube having a pair of main electrodes and an auxiliary starting electrode, and circuit means to actuate said auxiliary electrode to initiate oscillations in said arc tube, said circuit means including a resistance, a thermostatic device having a heater element and a movable element in operative relation with said auxiliary electrode, and a switch means adapted when closed to supply heating current to said heater element from said input circuit to cause said auxiliary electrode to make contact with one of said main electrodes and when open to cause current from said input circuit to flow in series through said one of said main electrodes, said auxiliary electrode, and said resistance.

LAWRENCE D. MILES.